(12) United States Patent
Huang et al.

(10) Patent No.: US 8,056,058 B2
(45) Date of Patent: Nov. 8, 2011

(54) METHOD FOR GENERATING TEST CASES FOR SOFTWARE PROGRAM

(75) Inventors: Chin Yu Huang, Taipei County (TW); Jun Ru Chang, Taoyuan County (TW); Chih Tung Hsu, Hsinchu County (TW)

(73) Assignee: National Tsing Hua University, Hsinchu (TW)

( * ) Notice: Subject to any disclaimer, the term of this patent is extended or adjusted under 35 U.S.C. 154(b) by 1045 days.

(21) Appl. No.: 11/863,009

(22) Filed: Sep. 27, 2007

(65) Prior Publication Data

US 2008/0288925 A1    Nov. 20, 2008

(30) Foreign Application Priority Data

May 16, 2007   (TW) ............................... 96117334 A

(51) Int. Cl.
*G06F 9/44* (2006.01)
(52) U.S. Cl. ........................ 717/124; 717/128
(58) Field of Classification Search ........... 717/124–129
See application file for complete search history.

(56) References Cited

OTHER PUBLICATIONS

James Jones et al., "Test-Suite Reduction and Prioritization for Modified Condition/Decision Coverage", Mar. 2003, IEEE, vol. 29, No. 3, pp. 195-209.*
Mary Jean Harrold et al.,; A Methodology for Controlling the Size of a Test Suite; Journal; Jul. 1993; pp. 270-285; vol. 2, No. 3; ACM Transactions on Software Engineering and Methodology.
Kelly J. Hayhurst et al.,; A Practical Approach to Modified Condition/Decision Coverage; Journal; 2000; pp. 1-10; IEEE.
Kelly J. Hayhurst et al.,; A Practical Tutorial on Modified Condition/Decision Coverage; Journal; May 2001; pp. 1-85; NASA.
Philip J. Bernhard; A Reduced Test Suite for Protocol Conformance Testing; Journal; Jul. 1994; pp. 201-220; vol. 3, No. 3; ACM Transactions on Software Engineering and Methodology.
Jerry Gao et al.,;A Systematic Regression Testing Method and Tool for Software Components;Journal; 2006; pp. 1-9; Computer Society; COMPSAC'06; IEEE.
Todd L. Graves et al.,; An Empirical Study of Regression Test Selection Techniques; Journal; Apr. 2001, pp. 184-208; vol. 10, No. 2; ACM Transactions on Software Engineering and Methodology.
John Josephy Chilenski et al.,; Applicability of modified condition/decision coverage to software testing; Journal; Sep. 1994; pp. 193-200; Software Engineering Journal.
Jennifer Black et al.,; Bi-Criteria Models for All-Uses Test Suite Reduction; Journal; 2004; pp. 1-10; Computer Society; ICSE'04; IEEE.
John Joseph Chilenski et al.,; Formal Specification Tools for Test Coverage Analysis; Journal; 1994; pp. 59-68; IEEE.
Hiralal Agrawal et al.,; Incremental Regressing Testing; Journal; 1993; pp. 348-357; IEEE.
Gregg Rothermel et al.,; On Test Suite Composition and Cost-Effective Regression Testing; Journal; Jul. 2004; pp. 277-331; vol. 13, No. 3; ACM Transactions on Software Engineering and Methodology.
Kai-Yuan Cai et al.,; Partition Testing with Dynamic Partitioning; Journal; 2005; pp. 1-4; Computer Society; COMPSAC'05; IEEE.

(Continued)

*Primary Examiner* — Wei Zhen
*Assistant Examiner* — Lanny Ung
(74) *Attorney, Agent, or Firm* — WPAT, P.C.; Anthony King

(57) ABSTRACT

The method for generating test cases for a software program includes the step of setting a plurality of reference points in accordance with a sentence of the software program. The tracing pairs each including an initial test case as well as its adjacent vertex are set if one of them is among the reference points and the other one is not among the reference points. The essential test cases are chosen from the tracing pairs.

6 Claims, 4 Drawing Sheets

OTHER PUBLICATIONS

Joakim Aidemark et al.,; Path-Based Error Coverage Prediction; Journal; 2001; pp. 14-20; IEEE.

Sebastian Elbaum et al.,; Prioritizing Test Cases for Regression Testing; Journal; 2000; pp. 102-112; AMC.

Henry Muccini et al.,; Reasoning about Software Architecture-based Regression Testing through a Case Study; Journal; 2005; pp. 1-7; Computer Society; COMPSAC'05; IEEE.

Yong Y. Li; Structural Test Cases Analysis and Implementation; Journal; 1999; pp. 882-885; IEEE.

Zhenqiang Chen et al.,; Test Coverage Analysis Based on Program Slicing; Journal; 2003; pp. 559-565; IEEE.

Jerry Gao et al.,; Testing Coverage Analysis for Software Component Validation; Journal; 2005; pp. 1-8; COMPSAC'05; IEEE.

James A. Jones et al.,; Test-Suite Reduction and Prioritization for Modified Condition/Decision Coverage; Journal; Mar. 2003; p. 195-209; vol. 29, No. 3; Transactions on Software Engineering; IEEE.

Sergiy A. Vilkomir et al.,; Tolerance of Control-Flow Testing Criteria; Journal; 2003; Computer Society; COMPSAC'03; IEEE.

* cited by examiner

```
[ClassName]
foo
[funcName]
public int div(boolean A,boolean B,boolean C,boolean D)
[lineNum]
8
[profix]
or xor _1_MC_DC_4 _1_MC_DC_3 and not _1_MC_DC_2 _1_MC_DC_1
[result]
test case #1 :  0  0  0  0
test case #2 :  1  0  0  0
test case #3 :  0  1  0  0
test case #4 :  0  0  1  0
test case #5 :  0  0  0  1
[endResult]
[endLine]
[endFunc]
[endClass]
```

```
01  import java.io.*;
02  class foo {
03    public foo() {
04    }
05    public int div(boolean A, boolean B,
                     boolean C, boolean D) {
06      int a = 0;
07      if((A && !B) || (C ^ D)) {
08        int b = 0;
09      }
10      return 0;
11    }
12    public static void main (String[] args) {
13      boolean m1 = args[0].equals("0");
13      boolean m2 = args[1].equals("0");
13      boolean m3 = args[2].equals("0");
13      boolean m4 = args[3].equals("0");
17      new foo().div(m1, m2, m3, m4);
18    }
19  }
```

METHOD FOR GENERATING TEST CASES FOR SOFTWARE PROGRAM

BACKGROUND OF THE INVENTION

1. Field of the Invention

The present invention relates to a method for generating test cases for a software program, and more particularly, to generating the method which uses fewer test cases but can still meet high-coverage requirement.

2. Description of the Related Art

When a piece of software is being developed, software testing is very important. The programmer usually creates some test cases for the modified part of the program based on his or her prior experiences in order to verify the correctness of the program. However, due to insufficient test time, the programmer would normally try to reduce the required test time, thus compromising software quality. Therefore, it is important to find out the required test cases within a limited period.

The term "coverage rate" is used to evaluate the coverage level which reflects how effectively the test cases can debug the program. There are many methods for calculating the coverage rate, such as statement coverage, branch coverage, condition coverage, decision coverage, condition/decision coverage, modified condition/decision coverage (MC/DC) and path coverage. For system testing of American airlines, a 100% coverage rate is required for the MC/DC criterion in order to reduce the number of hidden mistakes. Therefore, it is important to reduce the number of test cases but still be able to meet the high-coverage requirement.

SUMMARY OF THE INVENTION

The present invention proposes a method for generating test cases for a software program which is able to find less testing cases while still meeting the high-coverage requirement.

The method for generating test cases for a software program according to an embodiment of the present invention includes the step of setting a plurality of reference points in accordance with the at least one sentence, wherein the sentence includes n conditions, n is a positive integer, and the reference points are located among $2^n$ vertices expanded from the n conditions. Thereafter, tracing pairs each including an initial test case as well as its adjacent vertex are set up if one of them is among the reference points and the other one is not among the reference points. Also, an initial test case having the greatest number of appearances in the tracing pairs upon the n conditions is found, and this initial test case is included in a list of essential test cases. The vertices constituting the tracing pair with the initial test case having the greatest number of appearances are further included in the list of essential test cases.

The method for generating test cases for a software program according to an embodiment of the present invention includes the step of setting a plurality of reference points in accordance with a sentence of the software program. The tracing pairs each including an initial test case as well as its adjacent vertex are set if one of them is among the reference points and the other one is not among the reference points. The essential test cases are chosen from the tracing pairs.

BRIEF DESCRIPTION OF THE DRAWINGS

The invention will be described according to the appended drawings in which.

PREFERRED EMBODIMENT OF THE PRESENT INVENTION

The following embodiments take the MC/DC coverage as an example. However, that does not mean the present invention excludes other coverage criteria. The MC/DC coverage is described as follows. First, every statement of the program codes must be executed after all test cases are run through. Second, all output decisions of the sentences of the program have to be run through at least once. Third, all the conditions of the sentences have to be run through at least once. Fourth, if one condition changes but other conditions remain unchanged, the output decision of the sentence has to change thereafter. For example, suppose there is a sentence including the expression "A and B and C", which includes three conditions A, B and C. According to the second description, there must be at least two test cases, one of which makes the sentence true, and the other makes it false. According to the third description, there are some test cases which let all decisions (true and false) of A, B and C appear at least once. Finally, if there are two test cases, one of which makes the logical values of A, B, C and the decision as (true, true, true, true), but the other makes the logical values of A, B, C and decision as (false, true, true, false), then according to the fourth description, if the value of parameter A changes but the other conditions remain unchanged, the output decision of the sentence must be changed.

Figure 1A:
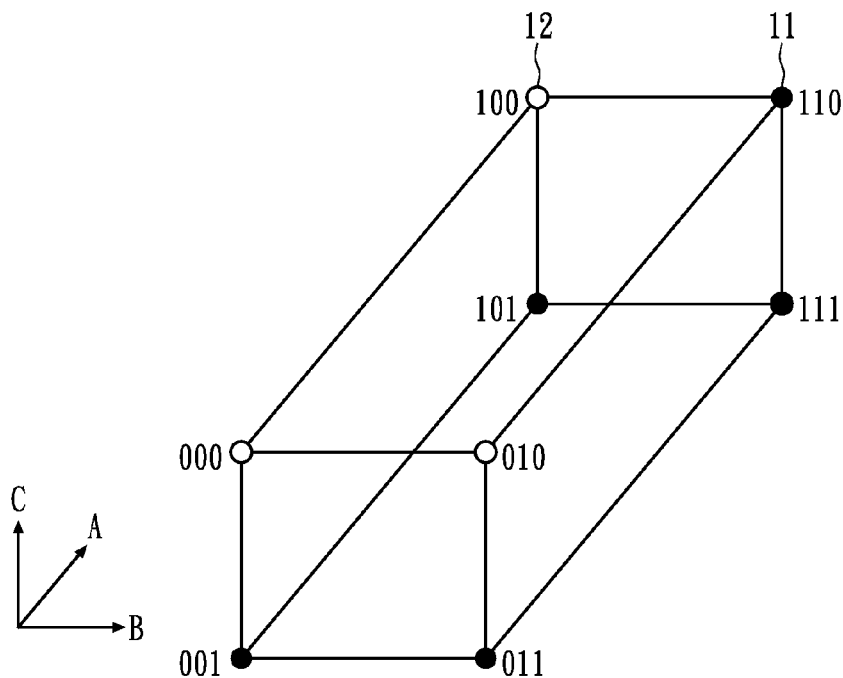
FIG. 1(a) shows the first embodiment of the present invention.

FIG. 1(a) shows the first embodiment of the present invention, which supposes a sentence of "A and B or C," and includes parameters A, B and C. Because there are three conditions, there are $2^3$ variances, and a 3-cube denotation is thereby used. For example, if the binary representation of a vertex is 001, that means the logical value of the parameter A is false, the logical value of the parameter B is false, and the logical value of the parameter C is true. Therefore, if the logical values of A, B and C are 001, 011, 101, 110 or 111, the logical value of the sentence is true. Meanwhile, the corresponding vertices are called reference points, shown as black dots in FIG. 1(a).

Supposing table 1 includes initial test cases based on the experiences of a software programmer:

TABLE 1

|  | A | B | C |
| --- | --- | --- | --- |
| Test case #1 | 1 | 1 | 1 |
| Test case #2 | 1 | 0 | 1 |
| Test case #3 | 0 | 1 | 1 |
| Test case #4 | 0 | 0 | 0 |
| Test case #5 | 1 | 0 | 0 |

Figure 1B:
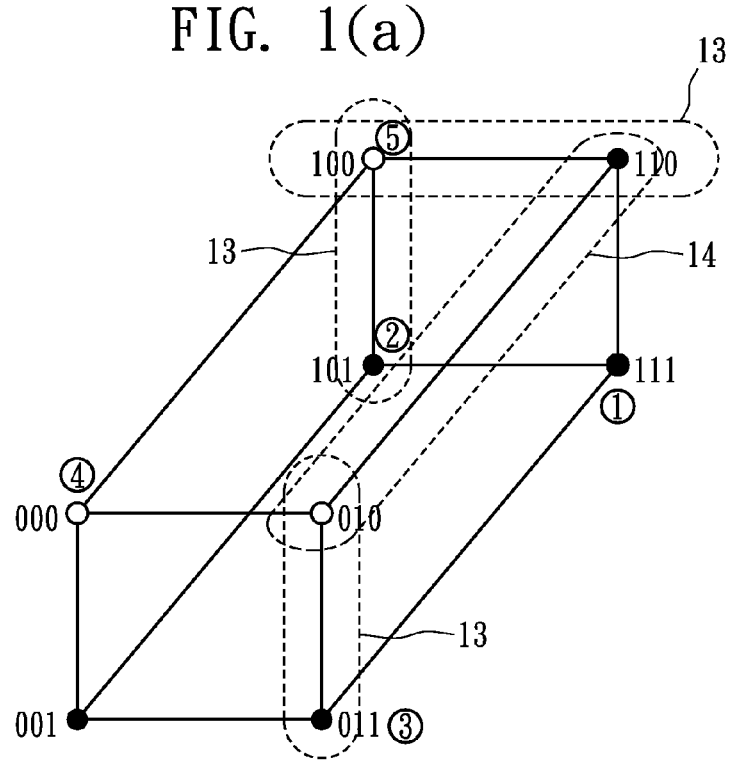
FIG. 1(b) shows the tracing pairs of the first embodiment.

As shown in FIG. 1(b), when any of the plurality of the initial test cases is compared with its adjacent vertex, if one of them is a reference point (i.e., a black point) but the other one is not (i.e., a white point), the initial test case and its adjacent vertex are grouped as a tracing pair, or MC/DC pair 13. Table 2 shows the result of the tracing pairs.

TABLE 2

| Condition | Tracing pairs |
| --- | --- |
| A | None |
| B | (#5, 110) |
| C | (#2, #5), (#3, 010), (#4, 001) |

There may be more than one tracing pair in every condition, and therefore the initial test case which appears in the first place by frequency on the tracing pair upon every condition is pursued in order to obtain the most number of required tracing pairs. Take table 1 for example, test case #5 appears in the tracing pairs of both conditions B and C, and therefore test case #5 is included in the list of essential test cases. Thereafter, the vertices associated with the initial test case which appears in the first place by frequency in every tracing pair upon every condition are included in the list of the essential test cases as well. For example, test case #2 can be associated with test case #5 to form the tracing pair of condition C, and therefore test case #2 is included in the essential test cases. In addition, vertex 110 can be associated with test case #5 to form the tracing pair of condition B, and therefore test vertex 110 is included in the essential test cases.

After that, the next step is to find out omitted essential test cases. First, the non-initial test case among the essential test cases is set as a tracing point, e.g., vertex 110. If there is a condition which has not been found in any tracing pair (e.g., condition A), and one element of tracing pair 14 which includes tracing point 110 and its adjacent vertex 010 in the direction of condition A is a reference point (i.e., a black dot), but the other element is not a reference point (i.e., a white dot), then the adjacent vertex 010 is included in the list of essential test cases. As a result, the MC/DC criteria are satisfied only if test cases #2, #5, vertices 110 and 010 pass the test.

Figure 2A:
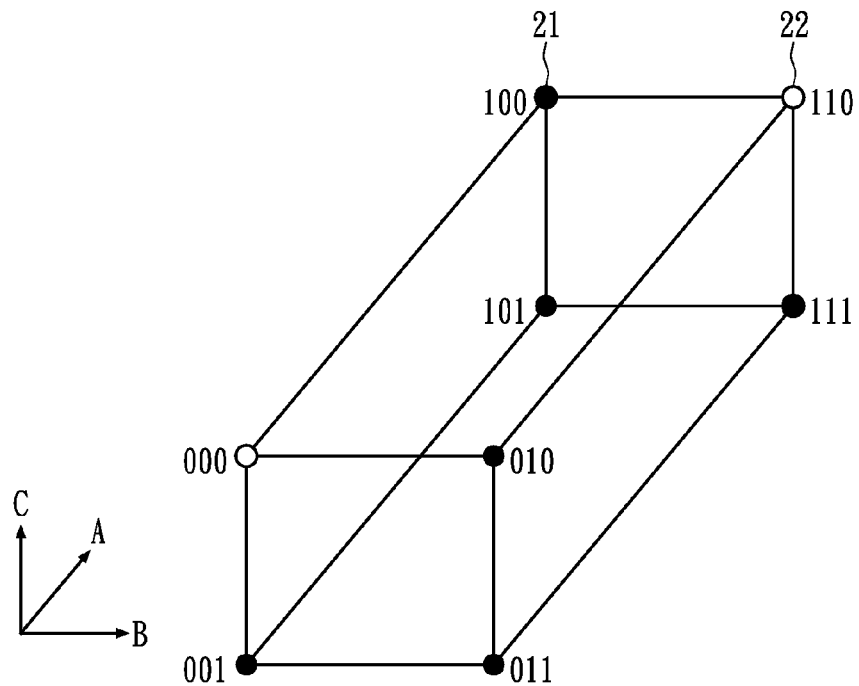
FIG. 2(a) shows the second embodiment of the present invention.

FIG. 2(a) is the second embodiment of the present invention, which supposes a sentence Z=A or B or C. While the logical values of the parameters A, B and C are 001, 010, 011, 100, 101 or 111, respectively, the sentence is logically true. Meanwhile, the corresponding vertices are called reference points, like the black dots shown in FIG. 2(a).

Supposing table 3 includes initial test cases raised by an experienced programmer:

TABLE 3

|  | A | B | C | Z |
| --- | --- | --- | --- | --- |
| Test case #1 | 0 | 0 | 0 | 0 |
| Test case #2 | 0 | 1 | 0 | 1 |
| Test case #3 | 0 | 0 | 1 | 1 |
| Test case #4 | 0 | 1 | 1 | 1 |

Figure 2B:
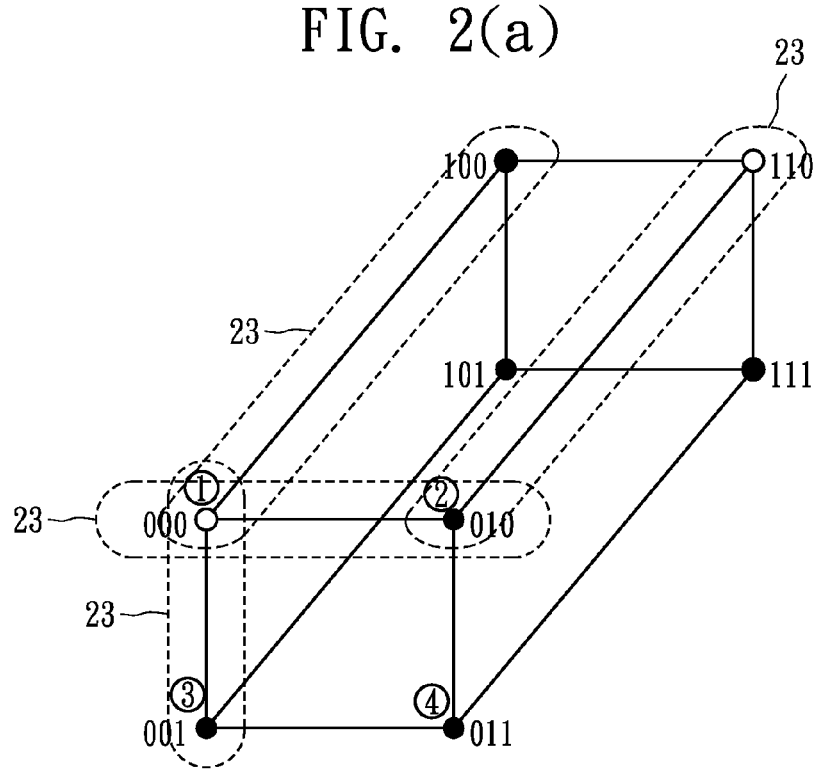
FIG. 2(b) shows the tracing pairs of the second embodiment.

As shown in FIG. 2(b), while any of the plurality of the initial test cases is compared with its adjacent vertex, if one of them is a reference point (i.e., a black dot) but the other one is not (i.e., a white dot), the initial test case and its adjacent vertex are grouped as a tracing pair, or MC/DC pair 23. Table 4 shows the result of the tracing pairs.

TABLE 4

| Condition | Tracing pair |
| --- | --- |
| A | (#1, 100), (#2, 110) |
| B | (#1, #2) |
| C | (#1, #3) |

As shown in table 4, test case #1 appears in the tracing pairs of all three conditions, and therefore test case #1 is included in the list of essential test cases. Test case #2 can be associated with test case #1 to form the tracing pair of condition B, test case #3 can be associated with test case #1 to form the tracing pair of the condition C, and therefore test cases is #2 and #3 are included in the essential test cases. Finally, in finding the omitted test cases, because test case #1 and vertex 100 or test case #2 and vertex 110 can constitute the tracing pairs of condition A, the programmer must find the test cases which render the logical values of the parameters A, B and C in the sentence as (true, false, false) or (true, true, false).

Figures 3A, 3B:
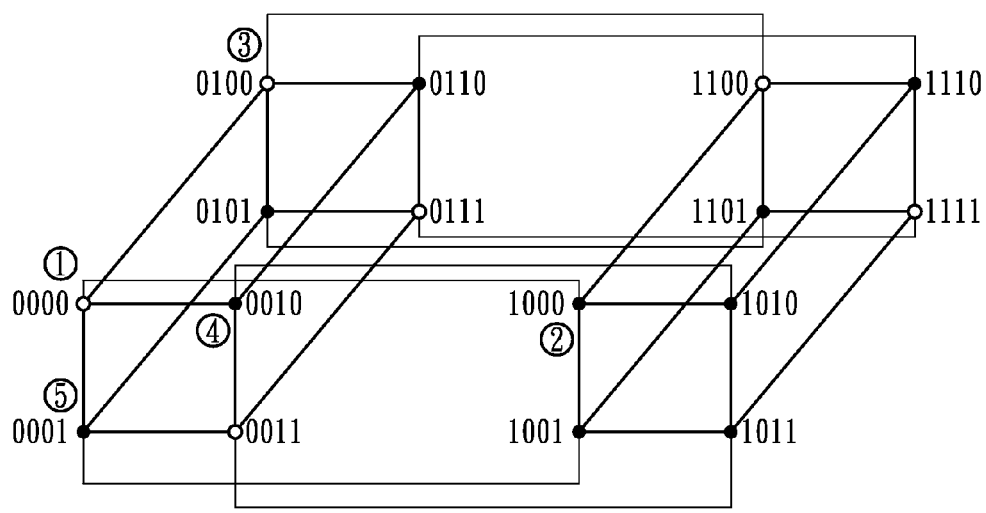
FIG. 3(a) shows the functional statement in accordance with the third embodiment of the present invention.
FIG. 3(b) shows the 4-cube representation in accordance with the third embodiment of the present invention.

FIG. 3(a) shows some functional statement. The invention could add some functional statements before every sentence in order to obtain some required information, such as prefix sentence, or to record the condition values of the sentence. FIG. 3(a) shows that after a sentence (A and not B) or (C xor D) is executed, some information of the sentence, like the class, the function, location in the program codes and prefix sentence, etc. is obtained.

Figures 3C, 4:
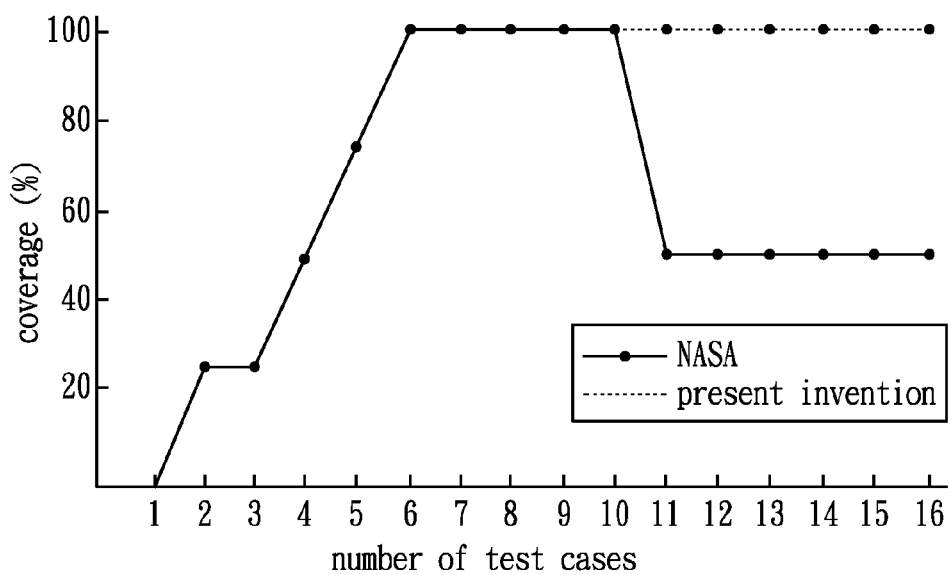
FIG. 3(c) shows a software program under test.
FIG. 4 shows a comparison diagram between the present invention and prior NASA testing method.

FIG. 3(b) shows a 4-cube representation according to the fourth embodiment of the present invention. FIG. 3(c) is a software program under test, where the sixth and eighth lines of the program codes have been amended, and therefore it is necessary to generate test cases for the amended part. Supposing table 5 includes initial test cases:

TABLE 5

|  | #1 | #2 | #3 | #4 | #5 |
| --- | --- | --- | --- | --- | --- |
| Condition A | 1 | 1 | 0 | 0 | 0 |
| Condition B | 1 | 0 | 1 | 1 | 1 |
| Condition C | 0 | 0 | 0 | 0 | 1 |
| Condition D | 0 | 0 | 0 | 1 | 0 |
| Result | 0 | 1 | 0 | 1 | 1 |

When the initial test cases are adopted to run the sentence of the seventh line in FIG. 3(c), the prior art NASA test method would choose test cases #1, #2, #4, #5 and vertex (0011). However, the prior NASA testing method is unable to find the tracing pairs of conditions A, C and D, and therefore something is missing if these three conditions embrace hidden mistakes. In contrast, the present invention can find test cases #1, #2, #3, #4, #5 and vertex (0000). Although the number of test cases of the present invention is slightly larger than that of the prior NASA testing method, the present invention is guaranteed not to miss any tracing pair which satisfies all conditions.

FIG. 4 shows a comparison diagram of the present invention and the prior NASA testing method. The way the present invention chooses the number of test cases follows this rule: if the number is one, (0000) is chosen; if the number is two, (0000) and (0001) are chosen; if the number is three, (0000), (0001) and (0010) are chosen, etc. FIG. 4 shows that when the number of the test cases is in excess of eleven, the coverage rate of the prior NASA testing method will be reduced to 50%. However, the present invention can still stay at 100% in that situation.

The above-described embodiments of the present invention are intended to be illustrative only. Numerous alternative embodiments may be devised by persons skilled in the art without departing from the scope of the following claims.

What is claimed is:

1. A method for generating test cases for a software program, the software program including at least one sentence, the method comprising the steps of:
    providing a plurality of initial test cases;
    setting a plurality of reference points in accordance with the at least one sentence, wherein the sentence includes n conditions, n is a positive integer, and the reference points are located among $2^n$ vertices expanded from the n conditions;
    setting tracing pairs each including an initial test case as well as its adjacent vertex if one of them is among the reference points and the other one is not among the reference points;
    finding an initial test case having the greatest number of appearances in the tracing pairs upon the n conditions, and including this initial test case in a list of essential test cases; and
    appending vertices constituting the tracing pair with the initial test case having the greatest number of appearances to the list of the essential test cases.

2. The method of claim 1, further comprising the steps of:
    setting a non-initial test case on the list of the essential test cases as a tracing point; and
    appending an adjacent vertex of the tracing point to the list of the essential test cases if no tracing pair exists on one condition, and either of the tracing point and its adjacent vertex is among the reference points but the other one is not among the reference points.

3. The method of claim 1, further comprising the step of adding a functional statement before the sentence in order to retrieve required information.

4. The method of claim 3, wherein the functional statement is a prefix sentence or for use in recording condition value of the sentence.

5. The method of claim 1, which is applied to adjust condition/decision coverage (MC/DC).

6. The method of claim 1, further comprising the step of:
    choosing any adjacent vertex of two tracing pairs if these two tracing pairs exist upon the same condition and each includes one essential test case.

* * * * *